Aug. 17, 1926.
L. J. STEPHENSON
DYNAMO ELECTRIC MACHINE
Filed March 28, 1921
1,596,255
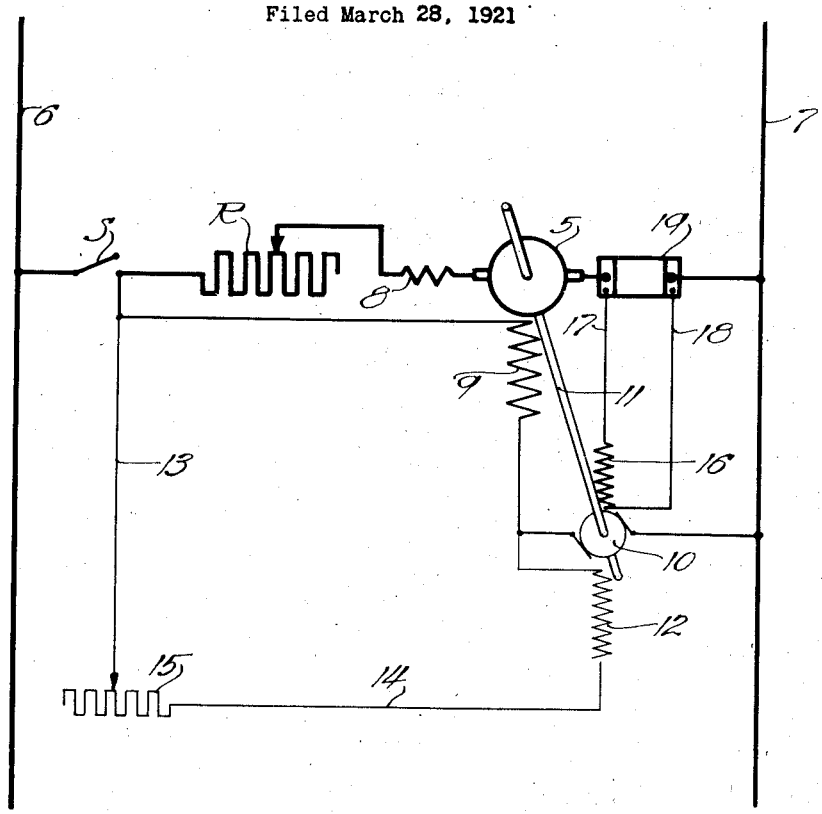
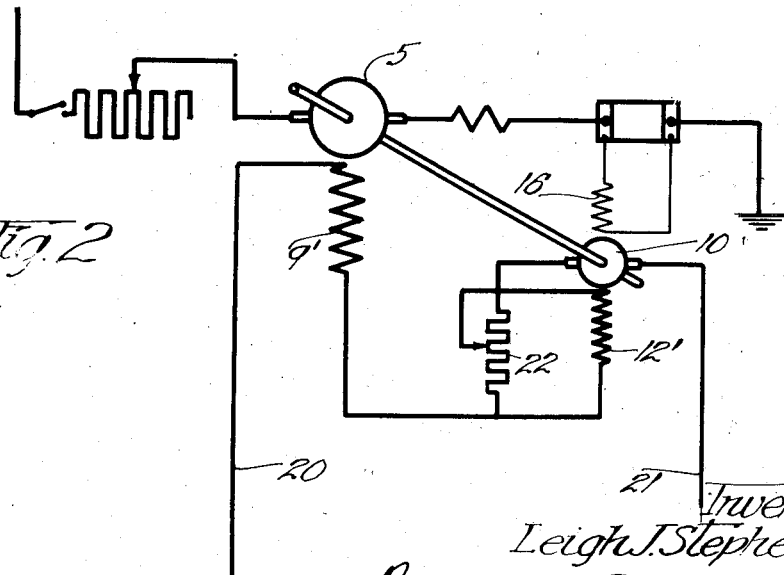
Inventor
Leigh J. Stephenson
Williams Bradbury,
See & McCaleb, Attys.

Patented Aug. 17, 1926.

1,596,255

UNITED STATES PATENT OFFICE.

LEIGH J. STEPHENSON, OF CHICAGO, ILLINOIS, ASSIGNOR TO B. V. BECKER, LEIGH J. STEPHENSON, GEORGE B. BURRAGE, WILLIAM T. FENTON, AND LYNN A. WILLIAMS, TRUSTEES, ALL OF CHICAGO, ILLINOIS.

DYNAMO-ELECTRIC MACHINE.

Application filed March 28, 1921. Serial No. 456,352.

My invention relates to improvements in dynamo electric machines, and is particularly concerned with the provisions of means for controlling the operation of such machines to cause them to operate either as motors or as generators. My invention is particularly adaptable to dynamo electric machines designed for driving traction vehicles or other machines, the speed of which must be adjusted and for driving machinery which is frequently started and stopped.

My present invention relates to certain modifications of the apparatus described and claimed in my Reissue Patent No. 14,787 of January 6, 1920.

The principal objects of my present invention are:—

First—to provide novel means for compensating for fluctuations in line voltage during either the motoring or the regenerating period.

Second—to provide novel means for securing the desired speed torque characteristic during both the motoring and the generating period, and Third—to provide means of the character described which is of simple construction and economical to manufacture.

Other objects will appear as this description progresses, reference being had to the accompanying drawings in which Figure 1 is a schematic diagram of the apparatus embodying my invention, and Figure 2 is a similar diagram showing a modified form of my invention.

In the embodiment of my invention illustrated in Figure 1, the reference character 5 indicates the armature of a dynamo-electric machine which is intended to operate as a motor for driving traction vehicles or other machines, the speed of which must be varied and controlled, or for driving machinery which is to be frequently started and stopped. Current is supplied to the armature 5 thru the line wires 6 and 7, the switches and the adjustable starting resistance (R) I have illustrated this dynamo electric machine as being provided with a commutating field winding 8.

The field winding 9 of the dynamo electric machine which is preferably of the shuntfield type, is connected in series with the armature 10 of the regulating dynamo electric machine which will hereafter be referred to briefly as the regulating dynamo, to form a field winding circuit which is connected directly across the line wires 6 and 7. The armature 10 of the regulating dynamo is illustrated as being mounted upon the shaft 11 of the dynamo electric machine having the armature 5, so that the armature of the regulating dynamo must necessarily operate at a speed constantly proportional to the speed of the dynamo electric machine having the armature 5. The regulating dynamo has a field winding 12 which is connected in parallel with the field winding 9 by means of conductors 13 and 14, there being an adjustable rheostat 15 connected in series with the field winding 12, by means of which the current thru the field winding 12 can be adjusted from zero to maximum.

The construction thus far described is identical with that described and claimed in my re-issue patent above referred to and further description thereof is, therefore, unnecessary. My present invention differs from that described in my re-issue patent in that it provides a second field winding 16 for the regulating dynamo, which is differentially wound with respect to the field winding 12 so that during motor operation it opposes the field winding 12 and during the regeneration period it assists the field winding 12. The field winding 16 is connected by means of conductors 17 and 18 across the terminals of the shunt resistance 19, which has a low ohmic resistance, and which is connected in series with the armature 5, so that the current in the field winding 16 is always constantly proportional to the current thru the armature 5. If desired, the winding 16 can be connected directly in series with the armature 5, so that it will carry the entire current thru the armature 5.

In operation, when the dynamo electric machine, having the armature 5, is functioning as a motor, if an additional load should be imposed thereon, as for instance, when a car driven by the apparatus described herein begins to mount a grade, the speed of the motor will decrease, thereby permitting an initial increased current thru the armature and a proportional increase in current thru the field winding 16. As field winding 16, during the motoring operation opposes the field winding 12, the excitation of the regulating dynamo will be decreased, thereby permitting an increase of current thru the field winding 9 with a consequent reduction in speed of the dynamo electric machine, having the armature 5. This reduction in speed of the armature 5 causes a corresponding reduction in speed of the armature 10, thereby reducing the counter electromotive force of the regulating dynamo and permitting a still further increase in current thru the field winding 9 and a further reduction in the speed of the motor. This action continues until the increased field strength of the dynamo electric machine will produce a torque sufficient to carry the increased load.

During the generating action, that is, while the dynamo electric machine is functioning as a generator, to convert the momentum of the load into electric energy, which is returned to the line, field winding 16 assists the field winding 12, as a result of which anything tending to increase the speed of the motor, such, for instance, as the car travelling down grade, tends to increase the counter electromotive force of the regulating dynamo and correspondingly decreases the field produced by field winding 9. It will, therefore, be seen that the function of the winding 16, during regeneration, is to limit the regenerated current to an extent which is determined by the relative proportions of the two field windings, 12 and 16.

The arrangement shown in Figure 2 is similar to that described above, except that in this figure the field winding 9' of the dynamo electric machine having the armature 5, is of the series type, and the field winding 12' of the regulating dynamo is connected in series with the field winding 9', these two windings being in turn connected with the armature 10 of the regulating dynamo to form a field winding circuit which may be connected by conductors 20 and 21 with any suitable source of current which may be the source supplying current to the armature 5 or a separate and distinct source, as, for instance, a motor generator set.

For adjusting the relative amounts of current thru the field windings 9' and 12', I connect an adjustable resistance 22 in parallel with the field winding 12'. Otherwise, the construction illustrated in this figure is the same as that shown in Figure 1. This modified form of my apparatus functions in substantially the same manner as that shown in Figure 1.

In both embodiments of my invention, the field winding 16, by its reaction upon the armature 10, and therefore upon the field windings 9 and 9', tends to compensate for fluctuation in line voltage during either the motoring or the generating period. During motoring, any increase in line voltage will tend to cause a greater current thru the field winding 16, thereby decreasing the voltage of the regulating dynamo and correspondingly increasing the current thru the field winding 9. This increase in current thru the field winding 9 will cause a corresponding increase in the counter electromotive force of the dynamo electric machine and consequently tend to prevent a surge of current therethru. Conversely, any drop in the line voltage during the regeneration period will cause a corresponding increase in the current thru the field winding 16, which will increase the voltage of the regulating dynamo and decrease the current thru the field winding 9, thereby decreasing the generated voltage of the dynamo electric machine having the armature 5, thus preventing any material increase in the current delivered to the line.

While I have described the details of construction of the preferred embodiments of my invention, it is to be clearly understood that my invention is not limited to these details of construction, but is capable of other adaptations and modifications within the scope of the appended claims.

Having thus described my invention, what I claim is:

1. The combination with a motor having a field winding, of a regulating dynamo connected in series with said field winding to form a field winding circuit, means for impressing a voltage on said field winding circuit, a field winding for said regulating dynamo connected in parallel with said motor field winding, a second field winding for said regulating dynamo, differentially wound with respect to said first named regulating dynamo field winding, means for supplying current to said second field winding at a rate constantly proportional to the current thru said motor and means for causing said regulating dynamo to rotate at a speed constantly proportional to the speed of said motor.

2. The combination with a dynamo electric machine having a field winding, of a regulating dynamo connected in series with said field winding to form a field winding circuit, means for impressing a voltage on said field winding circuit, a field winding for said regulating dynamo connected in parallel with said field winding, a second field winding for said regulating dynamo, means for supplying a current to said second field winding which is constantly proportional to the current thru said dynamo electric machine and means for causing said regulating dynamo to rotate at a speed constantly proportional to the speed of said dynamo electric machine.

3. The combination of a dynamo electric machine, having a field winding, and a regulating dynamo, the armature of which is connected in series with said field winding, said regulating dynamo having two field windings, one of which carries a current proportional to the current thru said dynamo electric machine field winding and the other of which carries a current proportional to the current thru the armature of said dynamo electric machine.

In witness whereof, I hereunto subscribe my name this 22nd day of March, 1921.

LEIGH J. STEPHENSON.